United States Patent [19]
Albrecht

[11] 3,813,540
[45] May 28, 1974

[54] CIRCUIT FOR MEASURING AND EVALUATING OPTICAL RADIATION

[75] Inventor: Peter Albrecht, Augsburg, Germany

[73] Assignee: The National Cash Register Company, Dayton, Ohio

[22] Filed: Mar. 26, 1973

[21] Appl. No.: 344,824

[52] U.S. Cl. ............................... 250/206, 250/555
[51] Int. Cl. ................................. H01j 39/12
[58] Field of Search.. 250/219 D, 219 DC, 219 DD, 250/206, 208, 214, 231 R, 231 SE, 221, 222; 307/311; 235/61.11 E; 340/146.3 J

[56] References Cited
UNITED STATES PATENTS

| | | | |
|---|---|---|---|
| 3,461,300 | 8/1969 | Braun | 250/219 D |
| 3,560,751 | 2/1971 | Buettner | 250/214 |
| 3,573,466 | 4/1971 | Vonfeldt | 307/311 |
| 3,604,941 | 9/1971 | Crum | 235/61.11 E |
| 3,654,478 | 4/1972 | Fuwa | 250/219 DC |
| 3,660,670 | 5/1972 | Howard | 250/206 |
| 3,670,637 | 6/1972 | Mori | 250/206 |
| 3,694,629 | 9/1972 | Ogawa | 250/219 D |
| 3,708,678 | 1/1973 | Kreda | 250/219 D |

*Primary Examiner*—James W. Lawrence
*Assistant Examiner*—D. C. Nelms
*Attorney, Agent, or Firm*—J. T. Cavender; Albert L. Sessler, Jr.; Edward Dugas

[57] ABSTRACT

The invention relates to a circuit for optically sensing coded data on a record medium and including a photosensitive transducing element such as a phototransistor. In order to render the circuit independent of background brightness variations, the load impedance of the transducing element includes one or more of series connected diodes which have an exponential characteristic curve, so that the voltage drop across the diode or diodes is proportional to the natural logarithm of the current flowing through the transducing element. The voltage difference resulting from sensing contrasting marks on the record medium thus depends only on the contrast in reflected light and not on the absolute value of the current in the transducing element.

2 Claims, 1 Drawing Figure

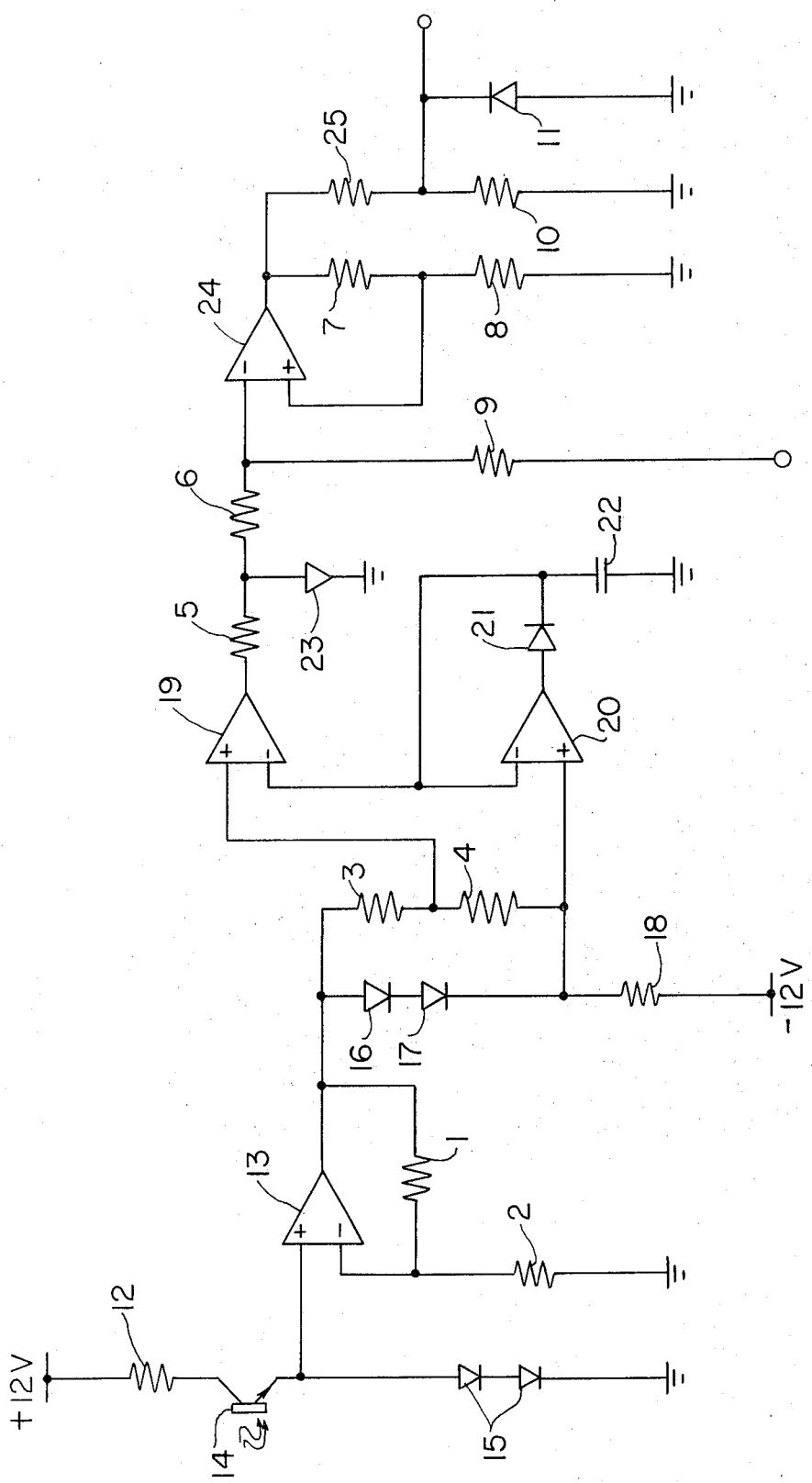

CIRCUIT FOR MEASURING AND EVALUATING OPTICAL RADIATION

The invention relates to a circuit for measuring and evaluating optical radiation with a radiation-sensitive element, and especially for measuring and evaluating the light reflected from a data record medium.

Circuits of the above kind are known which are used, e.g., as a light barrier for watching rooms, lift doors, and entrance doors, and in reading circuits for optical entries on data record media. In these circuits, if accuracy is necessary, it must be guaranteed that exactly defined light relationships are present. For many uses it is therefore not possible to work with existing space lighting because this varies greatly in intensity. Therefore in many cases an artifical source of light must be used. Especially with reading circuits, it is further necessary that the light intensity of the artificial light source is kept constant by control circuits. If an artificial light source shows signs of ageing, in general further use is not possible.

It is an object of the invention to provide a circuit for evaluating optical radiation, which can operate accurately without adjustments in a wide range of illumination, and which is consequently substantially cheaper than known circuits.

In accordance with one preferred embodiment of this invention, there is provided a circuit for evaluating optical radiation which includes radiation-sensitive means for evaluating light reflected from a data medium and a load impedance coupled as the load of said radiation-sensitive means. The load impedance has an exponential voltage current characteristic such that the voltage drop across the impedance is proportional to the logarithm of the current flowing through the impedance.

An embodiment of the invention will be described with reference to the FIGURE which shows a circuit for evaluating reading light reflected from a data record medium.

In the FIGURE a photo-transistor 14 is used as the radiation-sensitive element. This is arranged with its collector connected via a resistor 12 to +12 volts. In the embodiment described here, the photo-transistor 14 is illuminated with light reflected from a data record medium (not shown). On the data record medium, which is transported past the reading apparatus by means of a suitable arrangement, the data is indicated, e.g., by black stripes on a white paper record medium. Of course the record medium can be fixed during the reading process, and the reading head can be moved over it. The record medium can be illuminated either by an artificial light source or by day light or the room lighting. In the circuit described here, an artificial light source is necessary only when accurate operation is needed in a room in which the space lighting undergoes very great variations. According to the invention, the load impedance of the photo-transistor is made up of one or more elements connected in series which have an exponential characteristic.

In the FIGURE, for example, two semiconductor diodes 15 connected in series are used. The photo-transistor 14 should operate in its linear region, so that the current flowing through it is proportional to the amount of light falling on it.

A substantial advantage of the circuit of the invention is that by using the semiconductor diodes 15 as load impedance for the photo-transistor 14 the voltage or change in voltage across the semiconductor diode 15 depends only on the relative changes in light intensity, and that because of the compression of the characteristic of the photo-transistor the circuit can operate without difficulty in high intensity light.

The semiconductor diodes 15 have an exponential characteristic, i.e., $$i_F = I_o \exp(V_F / V_T)$$

$V_F$ = the applied voltage
$I_o$ = the diode cut-off current
$i_F$ = the current through the diode
$V_T$ = the temperature potential $- kT/e$.

Assume that a current $i_s$ produced by light reflected from a black mark, and a current $i_w$, produced by light reflected from the background of the record medium, flows through the photo-transistor 14. Then the expression $$i_W / i_S = \frac{1}{4} = \exp((V_W - V_S) / V_T)$$ is obtained, where $V_W$ and $V_S$ are the voltages appearing across the semiconductor diode 15 caused by light reflected from the background or from a black mark. Taking the logarithm of the above expression, $$V_W - V_S = V_T \log_n 1/r$$

where $1/r$ is the reciprocal of the reflection factor, and gives the ratio of the amount of light received from white and black parts of the record medium.

It follows from the above, that the voltage difference as a result of the difference reflection of light depends only on the contrast, i.e., on the reflection factor $r$, between the black stripes and the white background of the record medium, and no longer depends on the absolute value of the photo-electric current.

It has been shown experimentally, that with conventional photo-transistors a range of several decades (0.5 microamps to 100 milliamps) can be covered, so that as a result of the proportionality between the photo-electric current and the amount of light, the circuit works without difficulty by daylight as well as by normal artificial room lighting.

The voltage appearing across the semiconductor diodes 15 is amplified by a differential amplifier 13. As can be seen from the FIGURE, positive polarity is used.

Feedback for the differential amplifier 13 is provided over a resistor 1, so that the amplification factor can be adjusted. The negative input of the differential amplifier 13 is connected over a resistor 2 to earth, and the positive input is connected to the emitter of th photo-transistor 14. The output from the differential amplifier is fed to a voltage divider, which consists of a parallel circuit of two resistors 3 and 4 in series and two diodes 16 and 17. The lower end of the voltage divider is connected to a resistor 18 with a reference potential, in FIG. 1, for example, with −12 volts. The diodes 16 and 17 are connected in series with an anode of diode 16 connected to the output of amplifier 13 and the cathode of diode 17 connected to resistor 18, so that they operate in their low impedance region. The voltage appearing at the output of the differential amplifier 13, reduced by the amount lost at the voltage divider, is fed through a peak voltage equalizer, that is a differential amplifier 20 and a diode 21, to a capacitor 22 which acts as an analog store. The negative input of the differential amplifier 20 is connected to the negative input of a differential amplifier 19 and to the capacitor 22. The positive input of the differential amplifier 19 is connected to a point A between the resistors 3 and 4. Through the action of the differential amplifier 20 and the diode 21, the peak voltages which are produced by the brightest record medium backgrounds are stored in the capacitor 22. This value present in the capacitor 22 serves as a reference voltage for the differential amplifier 19. The capacitor 22 has a discharge path over the input impedance of the differential amplifiers 19 and 20. If this path has too great an ohmic resistance, a further impedance can be connected in parallel with the capacitor 22. By choice of the resistance ratio of the resistors 3 and 4 the voltage difference necessary to cause the differential amplifier 19 to switch is fixed. For example, if the voltage at the positive input of the differential amplifier 19 is greater, the output of the differential amplifier 19 is also positive. It becomes negative when the voltage at the positive input from point A becomes smaller than that present across the capacitor 22 at that moment by an amount fixed in particular by the resistor 4. In this case a black stripe is being read. In this way the size of the voltage i.e. the contrast ratio between the white background of the data record medium and a black mark that will be detected by the circuit can be fixed by the size of the resistor 4.

The output of the differential amplifier 19 is connected over a resistor 5 and a resistor 6 with the negative input of a differential amplifier 24. Between the resistors 5 and 6 a diode 23 is connected to earth, which provides a negative limit to the signal appearing at the output of the differential amplifier 19.

The differential amplifier 24 works as a flip-flop, because a suitable feedback is applied from its output across a resistor 7. This flip-flop can be switched by a suitable signal across a resistor 9 and the negative input. The positive input is connected to earth via a resistor 8. The signal appearing at the differential amplifier 24 is transmitted via a suitable impedance circuit of resistors 25, 10 and a diode 11 to the next circuit e.g. to a TTL (transistor-transistor logic) circuit.

A further possible application is that both base electrodes of a conventional differential amplifier may be connected through a resistor to the emitter of the photosensitive element.

One base electrode is connected to earth through a capacitor. A high pass filter is formed by the capacitor and the resistance connected to it, which prevents slow voltage changes, e.g., as a result of changing light in the room because of cloud formation, affecting the differential amplifier. The changes at the differential amplifier can be indicated by conventional circuits. Thus this circuit can be used e.g., for light barriers without their own voltage source, since it is very sensitive and can operate in an extremely wide range of illumination.

What is claimed is:

1. A circuit for optically reading a data record medium on which data is recorded in the form of marks which have a different reflectivity from the record medium;

a phototransistor for sensing optical radiation, said phototransistor operating in its linear region and having a first current value associated with the background of the record medium and a second current value associated with the marks;

a load coupled to said phototransistor, the impedance of said load having an exponential voltage current characteristic such that the voltage drop across said load is proportional to the logarithm of the current flowing through said impedance, wherein said first current value causes a corresponding first voltage value to appear across said load impedance and said second current value causes a corresponding second voltage value to appear across said load impedance;

analog storage means for storing a voltage proportional to said first voltage value;

a first differential amplifier means for receiving at one input thereof the voltage across said load and at another input thereof a portion of the output signal of said first differential amplifier means;

a voltage divider for receiving at one end the remaining portion of the output signal from said first differential amplifier means, said voltage divider including at least one diode connected in parallel with first and second serially connected resistors;

a peak voltage equalizer including a second differential amplifier means with feedback and having a diode in series with the output of said second differential amplifier means, said peak voltage equalizer connecting the other end of said voltage divider to said analog storage means;

a third differential amplifier means having one input connected to said analog storage means and to the other input of said second differential amplifier means, the other input of said third differential amplifier means being connected to a point between said first and said second serially connected resistors of said voltage divider, such that the reference voltage switching point of said third differential amplifier means is determined by the value of said stored voltage, said third differential amplifier means being switched by the application to said other input thereof of a voltage proportional to said second voltage value.

2. The circuit according to claim 1, wherein a limiting circuit and a fourth differential amplifier means operating as a bistable element are associated with the output of the third differential amplifier means.

* * * * *